United States Patent [19]

Breed

[11] 4,329,549
[45] May 11, 1982

[54] MAGNETICALLY BIASED VELOCITY CHANGE SENSOR

[75] Inventor: David S. Breed, Boonton, N.J.

[73] Assignee: Breed Corporation, Fairfield, N.J.

[21] Appl. No.: 144,835

[22] Filed: Apr. 29, 1980

[51] Int. Cl.³ .......................................... H01H 35/14
[52] U.S. Cl. ........................... 200/61.45 M; 200/61.53
[58] Field of Search ............... 200/61.45 R, 61.45 M, 200/61.52, 61.53

[56] References Cited

U.S. PATENT DOCUMENTS

| 2,744,976 | 5/1956 | Black | 200/61.53 X |
|---|---|---|---|
| 2,854,537 | 9/1958 | Sternburgh | 200/61.45 M |
| 2,898,415 | 8/1959 | Clurman | 200/61.53 X |
| 2,997,557 | 8/1961 | Gillmor et al. | 200/61.53 X |
| 2,997,883 | 8/1961 | Wilkes | 200/61.53 X |
| 3,132,220 | 5/1964 | Uri et al. | 200/61.53 X |
| 3,256,397 | 6/1966 | Wintriss | 200/61.53 X |
| 3,485,973 | 12/1969 | Kaiser | 200/61.53 X |
| 3,673,367 | 6/1972 | Kaiser | 200/61.53 X |
| 3,774,128 | 11/1973 | Orlando | 200/61.45 M |
| 3,840,088 | 10/1974 | Marumo et al. | 200/61.45 M |
| 3,946,173 | 3/1976 | Haber | 200/61.45 M |

*Primary Examiner*—James R. Scott
*Attorney, Agent, or Firm*—Learman & McCulloch

[57] ABSTRACT

A velocity change sensor comprises a body having a passage within which is a movable sensing mass normally maintained in an inactive position by a magnetic biasing force, but which is movable from its inactive position to an operating position in response to acceleration exceeding the biasing force. Movement of the mass is fluid damped to delay its movement to the operating position for a period of time during which the acceleration must exceed the biasing force.

23 Claims, 5 Drawing Figures

MAGNETICALLY BIASED VELOCITY CHANGE SENSOR

BACKGROUND OF THE INVENTION

The invention relates to a velocity change sensor of the kind especially adapted for use with an automotive vehicle equipped with a passenger restraint, such as an inflatable air bag, the sensor being operable in response to a change in velocity of the vehicle of predetermined magnitude and duration to initiate operation of the restraint and provide protection for an occupant of the vehicle.

A sensor constructed in accordance with the invention has a movable acceleration sensing mass that is magnetically biased to and maintained in an inactive position until such time as it is subjected to acceleration in excess of the magnetic biasing force, whereupon the sensing mass may move from its inactive position toward a second position in which it is operable to initiate operation of a restraining device. The movement of the sensing mass toward its operative position is damped, thereby ensuring that the restraint device will not be actuated unless the change in velocity of the vehicle is of sufficient magnitude and occurs over a sufficiently short period of time to require operation of the restraint to protect an occupant of the vehicle.

It is generally accepted that an occupant of an automotive vehicle is likely to be injured if the vehicle is involved in a crash and is decelerated sufficiently rapidly to cause the occupant to impact a structural part of the vehicle, such as the dashboard or windshield, at about twelve miles per hour or more. If the occupant is to be protected under these conditions, it is imperative that the velocity change of the vehicle be sensed in such manner as to predict the existence of circumstances which will lead to occupant injury and initiate deployment of an occupant protective device in sufficient time to prevent the occupant's striking a structural part of the vehicle at twelve or more miles per hour. On the other hand, a vehicle may be subjected to a deceleration pulse of considerable magnitude, but the duration of such a pulse may be insufficient to cause a twelve miles per hour velocity change between the vehicle and the occupant. In these circumstances, deployment of the restraining device is unnecessary. Thus, an acceptable crash sensor is one which is capable of distinguishing between acceleration pulses in which occupant protection is and is not required.

Crash sensors heretofore proposed for use in actuating vehicle occupant restraint systems are of three kinds. One is an electronic sensor which has certain cost objections. The second is a sensor based on inertial flow of a liquid, such as that described in U.S. Pat. No. 3,889,130. The third is a sensor having an acceleration sensing mass on which a biasing force is imposed by a spring. Examples of spring biased sensors appear in U.S. Pat. Nos. 3,380,046; 3,889,130; 3,974,350; and 4,097,699; and copending application Ser. No. 37,524, filed May 9, 1978 now U.S. Pat. No. 4,284,863.

Spring biased sensors have achieved the greatest acceptance, but the utilization of a spring for the initial biasing force does have certain characteristics which must be overcome. For example, the force required to compress a compression spring increases as the spring is compressed. Thus, the biasing force exerted on the sensing mass by a relatively uncompressed spring is less than that exerted when the spring is compressed. As a consequence, the biasing force exerted by a spring on an acceleration sensing mass varies in response to movement of the mass and, in particular, increases to a maximum during the acceleration pulse, rather than being at a maximum at the beginning of the pulse, as is preferable.

During acceleration due to certain kinds of crashes, it is possible that the vehicle may be braked so that the crash acceleration, coupled with that due to braking, is sufficient to generate the twelve miles per hour relative velocity between the vehicle and an occupant. Braking alone of a vehicle, however, would not require deployment of the occupant restraint. Thus, a velocity change sensor used to activate a restraint device should be one which is so constructed that it will not commence operation until the acceleration to which it is subjected is somewhat above the maximum obtainable from braking.

A common value used for the co-efficient of braking friction is 0.7. Thus, the maximum acceleration due to braking may be considered to be 0.7 G, where G means acceleration due to gravity. Occasionally, somewhat higher values have been measured, but it generally is assumed that braking acceleration will never exceed 1 G. On the other hand, it can be shown that, at a constant acceleration of 2.4 Gs, a front passenger seat occupant of a typical larger vehicle will strike a structural part of the vehicle at a relative speed of twelve miles per hour after traveling twenty-four inches. It is desirable, therefore, that the initial bias on the crash sensor for such vehicles be no more than about 2.4 Gs. Constant acceleration pulses rarely occur in actual crash conditions. Nevertheless, it has been found that very reliable results can be achieved by imposing an initial biasing force on the sensor of less than 3 Gs, and preferably of about 2 Gs, and reducing the final biasing force on the sensor to about 1 G, thereby always maintaining a biasing force on the sensor greater than the acceleration due to braking.

In some of the smaller vehicles the distance between a front seat passenger and the vehicle's dashboard or a windshield is less than twenty-four inches. Sensors adapted for use in such vehicles will utilize a higher initial biasing force, but it does not appear that a biasing force of 5 Gs need be exceeded.

SUMMARY OF THE INVENTION

A crash sensor according to the invention is adapted for installation on an automotive vehicle equipped with a passenger protective instrumentality, such as an inflatable air bag, housed in the passenger compartment forwardly of the occupant in a deflated condition. When such vehicle is subjected to acceleration of the kind accompanying a crash, the air bag is inflated to provide a protective cushion for the occupant. A sensor constructed according to the invention comprises a body adapted to be mounted on the vehicle in a position to sense and respond to acceleration pulses. Within the body is a tubular passage in which is mounted a movable acceleration sensing mass formed of magnetically permeable, electrically conductive material. The mass is movable in response to an acceleration pulse above a threshold value from an initial, inactive position along a path leading to a normally open switch that is connected via suitable wiring to the operating mechanism of an inflatable air bag.

A biasing magnet acts on the acceleration sensing mass to bias the latter to its initial position under a preselected force which must be exceeded before the sensing mass may move from its initial position. When the sensing mass is subjected to an acceleration greater than the preselected biasing force, it moves from its initial position toward its air bag operating position. Movement of the sensing mass is fluid damped, thereby requiring a finite period of time for the sensing mass to move from its initial position to its operating position, during which time the acceleration must continue to exceed the bias force. The means for imposing the biasing force on the sensing mass has the property that such force diminishes as the sensing mass moves in a direction toward its operating position, but the construction is such that the sensing mass has a preselected portion of the biasing force imposed on it at all times.

DESCRIPTION OF THE DRAWINGS

Acceleration sensing apparatus constructed in accordance with a preferred embodiment of the invention is illustrated in the accompanying drawings, wherein.

DETAILED DESCRIPTION

Figure 1:
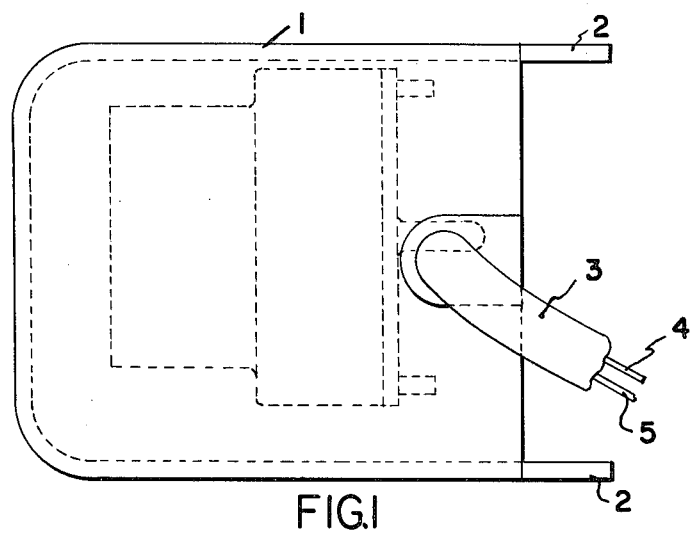
FIG. 1 is an elevational view of the apparatus in condition for installation on an automotive vehicle.

Apparatus constructed in accordance with the invention is adapted for use in conjunction with an automotive vehicle (not shown) and is accommodated within a closed, metallic casing 1 having mounting ears 2 by means of which the casing can be secured to the vehicle. Extending from and secured to the casing is one end of an insulating sheath 3 within which are electrical conductors 4 and 5 which form part of an electrical circuit subsequently to be described. The interior configuration of the casing 1 is complementary to the sensor apparatus so as snugly to retain the latter within the casing.

The sensor apparatus is designated generally by the reference character 6 and comprises a body 7 formed of suitable plastics material and having a cylinder 8 closed at one end by a wall 9. At the other end of the body is an enlarged, cylindrical skirt 10 defining a cylindrical chamber 11. Communicating with the chamber 11 is a bore 12 at the inner end of which is a groove 13 in which is accommodated a rubbery sealing ring 14. The inner surface of the end wall 9 is provided with a semi-spherical, concave seat 15 for a purpose to be explained. Fitted into the bore 12 and bearing against the seal 14 is a metallic sleeve 16 having a smooth inner surface forming a linear passage 17.

Accommodated within the passage 17 is a spherical, magnetically permeable, electrically conductive sensing mass 18, the radius of which corresponds substantially to that of the seat 15 and the diameter of which is slightly less than that of the passage 17.

Fixed in the chamber 11 is a cylindrical plug 19 formed of electrically insulating material, the plug being fixed in the chamber in any suitable manner, such as by cement, by ultrasonic welding, by crimping the rim of the skirt 10, or a combination thereof. One side of the plug 19 bears snugly against the sleeve 16 so as to maintain the latter tightly against the seal 14. That side of the plug 19 which confronts the sleeve 16 is provided with a diametral slot 20, the base 21 of which is flat. The slot 20 forms two upstanding ears 22 at the central portion of each of which is a spherical recess 23, the radius of each of which corresponds substantially to that of the seat 15. The recesses 23 together from a seat 15a, like the seat 15, but at the opposite end of the body 7.

The upstanding ears 22 of the plug 19 are cut away adjacent opposite ends of the base 21 to accommodate electrically conductive terminals 24 and 25 that are fixed to the plug by rivets 26 or the like. Forming an integral part of the terminal 24 is a springy contact blade 27 that is configured in such manner as to locate its free end near the mouth of the passage 17 and in the path of movement of the mass 18. The terminal 25 includes a similar contact blade 28, similarly oriented, the free ends of the blades 27 and 28 being spaced by a gap 29.

To the terminal 25 is joined one end of the conductor 4, the opposite end of which is adapted for connection to an energy source, such as a battery 30. The conductor 5 is connected at one end to the other terminal 24 and is adapted to have its other end connected to an operator 31 of known construction that is operable to activate a passenger restraining device 32 such as an inflatable air bag.

Means is provided for applying a magnetic biasing force on the mass 18 and comprises an annular magnet 33 having a venturi-like opening 34 therethrough in which is received a mounting ferrule 35 forming part of the body 7 and projecting beyond the wall 9. The magnet 33 may be maintained snugly in abutting relation with the body wall 9 by outwardly swaging or expanding the free end of the ferrule 35.

Figures 2, 3:
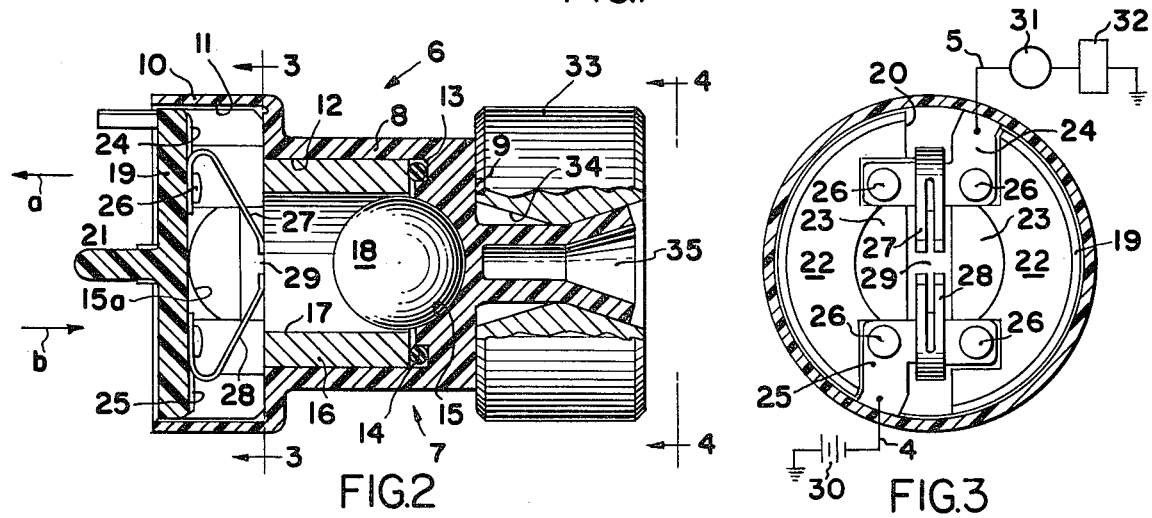
FIG. 2 is a transverse sectional view of the apparatus removed from its casing and illustrating the parts in positions they occupy when the apparatus is inactive.
FIG. 3 is a sectional view taken on the line 3—3 of FIG. 2, and also including a simplified schematic wiring diagram.
Figure 4:
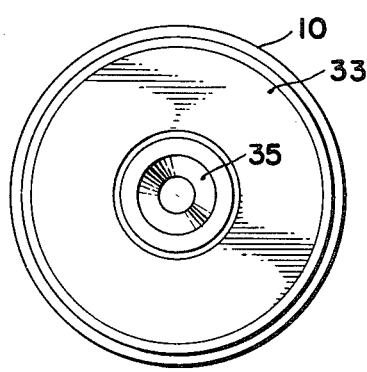
FIG. 4 is an end elevational view of the apparatus as viewed along the lines 4—4 of FIG. 2.

To condition the apparatus for operation the sensor mechanism is fitted into the casing 1 and the latter is fixed to a vehicle with the longitudinal axis of the passage 17 parallel or at a predetermined angle to the longitudinal axis of the vehicle, and with the magnet 33 facing toward the rear of the vehicle. The conductors 4 and 5 then may be connected in circuit with the battery 30, the operator 31, and the restraint 32 as is indicated in FIG. 3.

The magnet 33 will exert a magnetically attractive force on the sensing mass 18 so as normally to retain the latter in an initial, inactive position on the seat 15 at the closed end of the passage 17.

If the vehicle on which the sensor is mounted is traveling in the direction of the arrow a (FIG. 2) the sensing mass 18 will remain in its initial position until such time as the vehicle experiences an acceleration pulse in the direction of the arrow b greater than the biasing force exerted on the mass 18 by the magnet 33. If such acceleration pulse is of sufficient magnitude and duration, the sensing mass 18 will move from the position shown in FIG. 2 to an operating position, shown in FIG. 5, in which the mass engages and bridges the contact blades 27 and 28 and completes an electrical circuit from the energy source 30 to the operator 31 so as to activate the restraint device 32.

In a sensor constructed in accordance with the invention the strength of the magnet 33, the weight and the magnetic permeability of the sensing mass 18, and the distance between the mass and the magnet when the mass is in its initial position should be so proportioned that the attractive force exerted on the mass by the magnet is no greater than about 5 Gs, and preferably is about 2 Gs. These values also should be so proportioned that, when the mass 18 has moved through the passage 17 and away from the magnet a distance sufficient to enable the mass to engage and bridge the contact blades 27 and 28, the attractive force exerted on the mass by the magnet will have been reduced to about 1 G.

As has been indicated earlier, not all acceleration pulses exceeding the threshold bias force exerted by the magnet on the mass 18 necessitate actuation of the restraint device 32. Accordingly, a sensor constructed in accordance with the invention provides for damping the movement of the mass 18 so as to ensure that the restraint device will not be actuated unless the acceleration pulse not only exceeds the magnetic biasing force, but also endures for a period of time (and thus a velocity change) sufficient to require deployment of the restraint to prevent injury to an occupant. The velocity change required for initiation of deployment is readily calculable for various size sensors of the kind disclosed wherein the damping force is proportional to the velocity of the sensing mass, thus enabling the sensor to become an integrator in which the position of the sensing mass is proportional to the velocity change experienced by the sensor.

Damping of the movement of the sensing mass 18 is achieved by proportioning the diameters of the passage 17 and the mass 18 so that there is a clearance between the mass and the passage. The clearance is selected with reference to the desired velocity change, the size and weight of the mass, the length of the passage, and the fluid occupying the passage, i.e., whether the fluid is liquid, air, or other gas. The clearance is of such size as to restrict the flow of fluid therethrough as the mass 18 traverses the passage 17, thereby enabling the fluid to damp movement of the mass. It is preferred that the size of the clearance be such as to cause viscous, rather than inertial, flow of the fluid through the clearance.

Since a sensor associated with an automotive vehicle will be subjected to wide temperature variations the parts from which the sensor is constructed should be relatively unaffected by, or be capable of compensating for, such temperature changes. The low initial magnetic biasing force in the present sensor construction, as compared to crash acceleration forces, makes possible the use of a relatively low cost unoriented ceramic magnet. Oriented ceramic, rare earth, alnico, or other magnets could be used, but the availability and thermal stability of such magnets may not justify their higher cost.

The utilization of a ceramic magnet of annular configuration not only provides a convenient manner of mounting the magnet on the sensor body, but also enables the low ratio of initial to final bias values to be achieved.

The sleeve 16 preferably is constructed of metal, such as non-magnetic stainless steel, thereby resulting in a sensor that is considerably more rugged than sensors of the kind using glass cylinders, for example. The dissimilar metals used for the sensing mass and the sleeve are chosen to cause the clearance between them to vary with temperature to compensate for viscosity changes of the damping fluid due to temperature changes.

Of considerable importance in the construction of a crash sensor of the kind herein referred to is the period of time that the contact blades 27 and 28 are bridged. Obviously, the contact blades must be bridged for a sufficient length of time to enable operation of the restraint instrumentality when required. It is important, therefore, that the sensing mass 18 be prevented from rebounding immediately following engagement with the contact blades.

In the present construction the mass 18 will be virtually wholly within the passage 17 at the time the mass first engages either or both of the contact blades 27 and 28. The motion of the mass toward the contact blades, therefore, will continue to be damped by the fluid. Thus, the energy available for rebounding is less than would be the case if movement of the mass were not damped.

Figure 5:
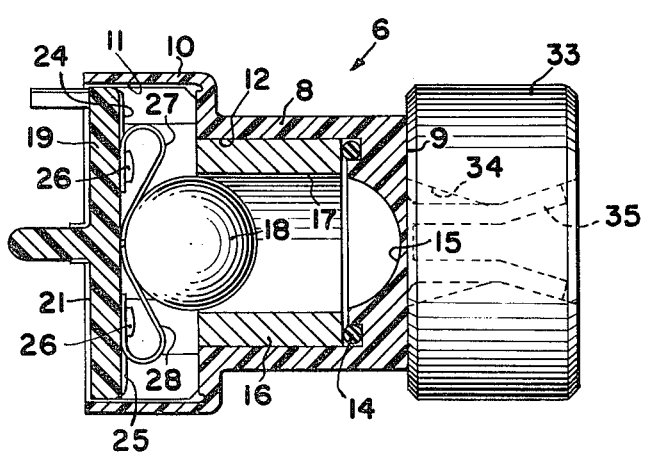
FIG. 5 is a view like FIG. 2, but illustrating the parts of the apparatus in their active positions.

In the construction illustrated in the drawings, the dimensions of the parts of the sensor are such that, when the mass bottoms on the plug 19, a little more than one half the mass 18 will have emerged from the sleeve 16, as is indicated in FIG. 5, thereby enlarging the clearance between the mass and the passage 17 and enabling equalization of the pressures in the chamber 11 and the passage 17. When the mass rebounds and commences return movement toward the initial position, the smaller, restrictive clearance will be reestablished, thereby enabling the fluid once again to damp movement of the mass so as to prolong engagement of the mass with the contact blades 27 and 28.

By varying the length of the sleeve 16 from that shown in FIG. 5, or by spacing the contact blades 27 and 28 more to the left of the sleeve 16, it is possible to effect equalization of the pressures in the chamber 11 and the passage 17 at any time between bottoming of the mass 18 on the plug 19, as explained above, and initial engagement of the mass with the contact blades 27 and 28. A sensor according to the invention, therefore, is adaptable to a number of different locations on a vehicle.

The disclosed embodiment is representative of a presently preferred form of the invention, but is intended to be illustrative rather than definitive thereof. The invention is defined in the claims.

I claim:

1. In a sensor construction adapted for mounting on a vehicle or the like having an instrumentality to be operated in response to acceleration of said vehicle above a predetermined threshold, said sensor having a body provided with a tubular passage containing a fluid, a magnetically permeable sensing mass within said passage movable in response to acceleration of said vehicle from an initial position toward a second position in which said sensing mass initiates operation of said instrumentality, there being a clearance between said passage and said sensing mass of such size as to enable said fluid to damp movement of said sensing mass, the improvement comprising magnetic means exerting a predetermined magnetic bias force on said sensing mass and restraining movement of the latter from said initial position until said bias force is overcome by acceleration whereupon said sensing mass is movable relatively to said body toward said second position, said magnetic means being of such capacity as to continue to exert on said sensing mass a magnetic force of decreasing magnitude as said sensing mass moves toward its second position, the magnetic force exerted by said magnetic means on said sensing mass being sufficient to return the latter to said initial position from any other position short of said second position.

2. A sensor construction according to claim 1 wherein said fluid is a gas.

3. A sensor construction according to claim 2 wherein said gas is air.

4. A sensor construction according to claim 1 wherein one end of said passage is closed and wherein the initial position of said sensing mass is adjacent said closed end of said passage.

5. A sensor construction according to claim 1 wherein said sensing mass is spherical.

6. A sensor according to claim 5 wherein said passage is of such length that as said sensing mass reaches said second position more than one half of said sensing mass has emerged from said passage.

7. A sensor construction according to claim 1 including actuating means adapted for connection to said instrumentality and extending into the path of movement of said sensing mass toward said second position for engagement by said sensing mass in response to movement of the latter a predetermined distance from its initial position.

8. A sensor construction according to claim 7 wherein said actuating means comprises electrically conductive, normally open switch means engageable by said sensing mass.

9. A sensor construction according to claim 8 wherein said sensing mass is formed of electrically conductive material.

10. A sensor construction according to claim 9 wherein said switch means includes spaced apart contacts, the spacing between said contacts being less than the corresponding dimension of said sensing mass.

11. A sensor construction according to claim 1 wherein said magnetic means comprises an annular magnet.

12. In a sensor construction of the kind having a body provided with a tubular passage containing a fluid and within which a magnetically permeable sensing mass is movable in one direction from an initial position toward a second position in response to acceleration of said body above a predetermined threshold in the opposite direction, there being a clearance between said passage and said sensing mass of such size as to enable said fluid to damp movement of said sensing mass, the improvement comprising magnetic means constantly exerting on said sensing mass a magnetic bias force, said bias force being of such magnitude when said sensing mass is in said initial position as to restrain movement of said sensing mass from said initial position until said bias force is overcome by a force due to acceleration whereupon said sensing mass is movable relatively to said body toward said second position as long as the force due to acceleration exceeds the magnetic force exerted on said sensing mass, said bias force being of such magnitude as to effect return of said sensing mass to said initial position from any other position short of said second position.

13. A construction according to claim 12 wherein said bias force is not more than about 5 Gs.

14. A construction according to claim 12 wherein said bias force is about 2 Gs.

15. A construction according to claim 12 wherein the distance between said initial and second positions is such that when said sensing mass occupies said second position said bias force is about 1 G.

16. A construction according to claim 12 wherein said magnet is annular.

17. A construction according to claim 12 wherein said magnet has an opening therein substantially in alignment with said passage.

18. A construction according to claim 12 wherein said clearance is of such size that fluid flow therethrough is substantially viscous.

19. A construction according to claim 12 wherein said one end of said passage is closed.

20. A velocity change sensor construction comprising a body having therein a passage containing fluid; a magnetically permeable sensing mass movably accommodated in said passage, the relative sizes of said mass and said passage establishing therebetween a clearance of such size as to restrict fluid flow therethrough and damp movement of said mass; and a magnet carried by said body and exerting on said sensing mass an initial bias force of such magnitude as to maintain said sensing mass in an initial position at one end of said passage until said mass is subjected to another force due to acceleration in excess of such bias force and in a direction toward said one end of said passage whereupon said sensing mass is enabled to move from said initial position toward a second position adjacent the opposite end of said passage, the bias force exerted by said magnet on said sensing mass diminishing as the latter moves toward said second position but being of such magnitude as to return said mass to said initial position from any other position short of said second position.

21. An acceleration sensor comprising a body having a passage therein; magnetic biasing means carried by said body adjacent but spaced from one end of said passage; and a magnetically permeable sensing mass positioned within said passage for movement in one direction along a path from a first position at said end of said passage to a second position further spaced from said biasing means and in response to acceleration above a predetermined threshold of said body in the opposite direction, said biasing means constantly exerting a magnetic force on said sensing mass opposing movement of the latter from said first position toward said second position, the strength of said magnetic means, the spacing between said magnetic means and said first position, the weight of said mass, and the length of said path between said first and second positions being so related that the magnetic force exerted on said sensing mass when the latter is in said first position is between about 2 to 5 Gs and the magnetic force exerted on said sensing mass when the latter is in said second position is about 1 G.

22. A sensor according to claim 21 wherein the magnetic force exerted on said sensing mass when the latter is in said first position is about 3 Gs.

23. A sensor according to claim 21 wherein the magnetic force exerted on said sensing mass when the latter is in said first position is about 2 Gs.

* * * * *

UNITED STATES PATENT AND TRADEMARK OFFICE
CERTIFICATE OF CORRECTION

PATENT NO. : 4,329,549
DATED : May 11, 1982
INVENTOR(S) : David S. Breed

It is certified that error appears in the above-identified patent and that said Letters Patent are hereby corrected as shown below:

Column 4, line 10, change "from" to -- form --.

Column 8, line 14, insert -- a -- after "containing";

line 39, insert -- one -- after "said"; line 52, change

"to" to -- and --

*Signed and Sealed this*

*Tenth* Day of *August 1982*

[SEAL]

*Attest:*

GERALD J. MOSSINGHOFF

*Attesting Officer*   *Commissioner of Patents and Trademarks*